US008856636B1

(12) United States Patent
Iampietro et al.

(10) Patent No.: US 8,856,636 B1
(45) Date of Patent: Oct. 7, 2014

(54) METHODS AND SYSTEMS FOR TRIMMING VIDEO FOOTAGE

(75) Inventors: Mike Iampietro, San Francisco, CA (US); Arvinder Singh, New Delhi, IN (US)

(73) Assignee: Adobe Systems Incorporated, San Jose, CA (US)

( * ) Notice: Subject to any disclaimer, the term of this patent is extended or adjusted under 35 U.S.C. 154(b) by 906 days.

(21) Appl. No.: 12/564,226

(22) Filed: Sep. 22, 2009

(51) Int. Cl.
*G06F 17/00* (2006.01)

(52) U.S. Cl.
USPC .......................................................... 715/202

(58) Field of Classification Search
USPC .................................................. 715/204, 202
See application file for complete search history.

(56) References Cited

U.S. PATENT DOCUMENTS

| | | | | |
|---|---|---|---|---|
| 6,366,296 | B1 * | 4/2002 | Boreczky et al. | 715/719 |
| 6,757,027 | B1 * | 6/2004 | Edwards et al. | 348/722 |
| 7,293,280 | B1 * | 11/2007 | Gupta et al. | 725/139 |
| 7,313,808 | B1 * | 12/2007 | Gupta et al. | 725/89 |
| 7,739,601 | B1 * | 6/2010 | Wong et al. | 715/731 |
| 2005/0111824 | A1 * | 5/2005 | Hunter et al. | 386/52 |
| 2005/0234719 | A1 * | 10/2005 | Hosoda et al. | 704/247 |
| 2006/0224940 | A1 * | 10/2006 | Lee | 715/500.1 |
| 2006/0228029 | A1 * | 10/2006 | Zhang et al. | 382/232 |
| 2006/0288288 | A1 * | 12/2006 | Girgensohn et al. | 715/716 |
| 2007/0074115 | A1 * | 3/2007 | Patten et al. | 715/716 |
| 2007/0248327 | A1 * | 10/2007 | Chen | 386/96 |
| 2007/0283269 | A1 * | 12/2007 | Obrador et al. | 715/723 |
| 2008/0019661 | A1 * | 1/2008 | Obrador et al. | 386/52 |
| 2008/0019669 | A1 * | 1/2008 | Girshick et al. | 386/117 |
| 2008/0249892 | A1 * | 10/2008 | Lelyveld et al. | 705/27 |
| 2009/0041356 | A1 * | 2/2009 | Barbieri et al. | 382/190 |
| 2010/0111498 | A1 * | 5/2010 | Weda et al. | 386/95 |

OTHER PUBLICATIONS

Girgensohn et al., A Semi-Automatic Approach to Home Video Editing, ACM, Proceedings of the 13th Annual ACM Symposium on User Interface Software and Technology, San Diego, CA, 2000, p. 81-89.*
Hua et al., Optimization-Based Automated Home Video Editing System, IEEE, IEEE Transactions on Circuits and Systems for Video Technology, vol. 14, No. 5, May 2004, p. 572-583.*
Barbieri et al., Movie-in-a-Minute: Automatically Generated Video Previews, Springer, Intelligent Algorithms in Ambient and Biomedical Computing, 2006, p. 89-101.*

* cited by examiner

*Primary Examiner* — Frank D Mills
(74) *Attorney, Agent, or Firm* — Kilpatrick Townsend & Stockton LLP (57) ABSTRACT

A media authoring application can be configured to use metadata associated with a media presentation to generate a score which serves to identify the interesting portions of the presentation and may thereby streamline the editing process. A method can comprise accessing metadata indicating at least one characteristic of a media presentation comprising a plurality of video segments, determining a qualitative score for at least one segment of the media presentation based on the metadata, and providing a user interface displaying the plurality of segments of the media file, the interface including a visual effect for at least one segment of the media file based on the segment's qualitative score. The method may comprise removing one or more segments based on comparing the score of the segment(s) to a parameter, such as a score threshold.

26 Claims, 5 Drawing Sheets

METHODS AND SYSTEMS FOR TRIMMING VIDEO FOOTAGE

TECHNICAL FIELD

The disclosure below generally relates to media editing, particularly to displaying information regarding media presentations that include video content and editing same.

BACKGROUND

A user can edit or create a media presentation comprising video content using any number of software applications. Examples of media authoring applications include, but are not limited to, Adobe® Premiere® Pro® and Premiere® Elements™, available from Adobe Systems Incorporated of San Jose, Calif. In an exemplary media authoring application, the user is presented a timeline view and one or more tracks for positioning video, audio, and other components (e.g., effects overlays). Video components may be represented in the tracks using one or more frames of the video.

SUMMARY

Although media authoring applications can comprise powerful and effective tools for creating/editing presentations, the process of editing can become cumbersome to users, especially amateur users. In accordance with one or more aspects of the present subject matter, a media authoring application can be configured to use metadata associated with a media presentation to generate a score which serves to identify the portions of the presentation that are of interest (or not of interest) and may thereby streamline the editing process.

Embodiments include a method comprising accessing metadata indicating at least one characteristic of footage of a media presentation. The metadata may be provided, for example, by one or more other modules that analyze media presentations or portions thereof upon import or use. The method can comprise determining a qualitative score for at least one segment of the media file based on the metadata and providing a user interface displaying the plurality of segments of the media file. The interface can include a visual effect such as highlighting for at least one segment of the media file based on the segment's qualitative score. In some embodiments, the method can comprise removing one or more segments based on comparing the score of the segment(s) to a parameter, such as a score threshold.

As will be noted below, the score can be based on one or more of a lighting, focus, contrast, or camera shake characteristic in the segment and/or a degree of movement of one or more subjects in the segment, recognition of one or more faces in the segment, audio content of the segment, or zoom/focus on a subject in the segment. Additionally or alternatively, the score may take into account camera movement before the segment, camera movement during the segment, camera movement after the segment, and/or the presence or absence of keyword tags in the metadata for the segment. In some embodiments, the score for a segment comprises a score for each of a plurality of frames of the presentation.

Embodiments also include systems and computer-readable media implementing one or more aspects of the present subject matter. These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Reference will now be made in detail to various and alternative exemplary embodiments and to the accompanying drawings. Each example is provided by way of explanation, and not as a limitation. It will be apparent to those skilled in the art that modifications and variations can be made. For instance, features illustrated or described as part of one embodiment may be used on another embodiment to yield a still further embodiment. Thus, it is intended that this disclosure includes modifications and variations as come within the scope of the appended claims and their equivalents.

In the following detailed description, numerous specific details are set forth to provide a thorough understanding of the claimed subject matter. However, it will be understood by those skilled in the art that claimed subject matter may be practiced without these specific details. In other instances, methods, apparatuses or systems that would be known by one of ordinary skill have not been described in detail so as not to obscure the claimed subject matter.

Figure 1:
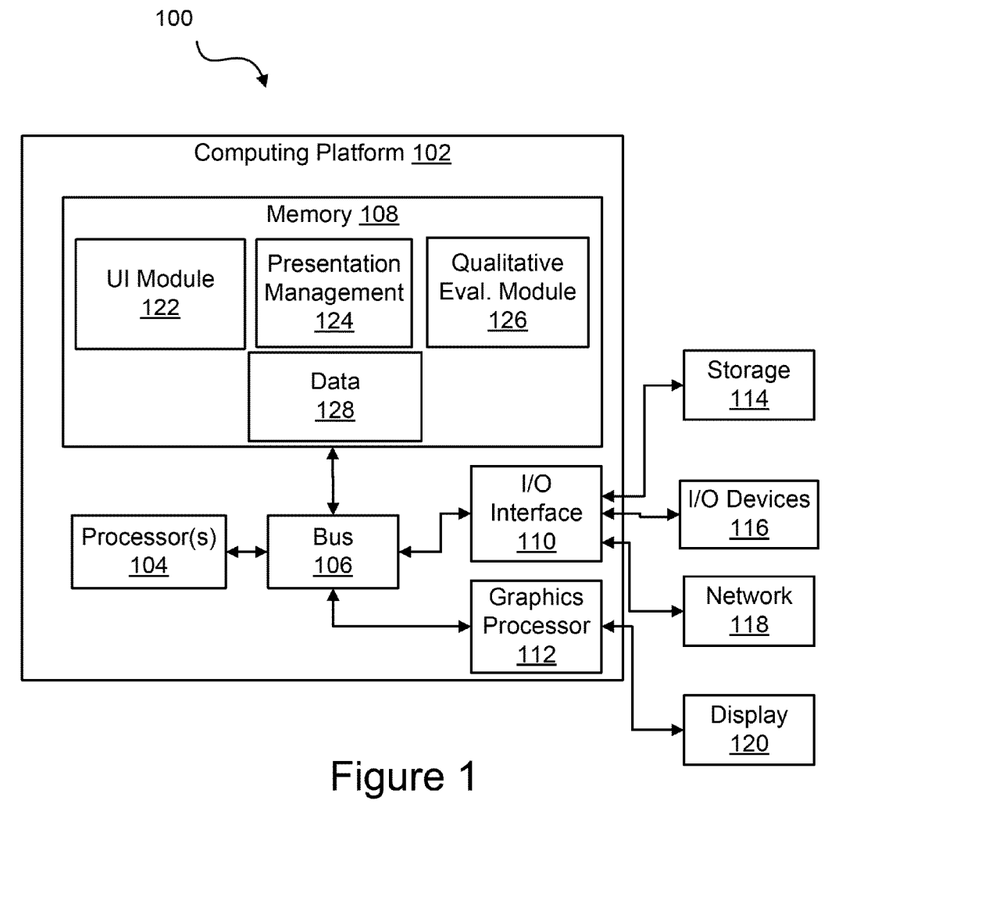
FIG. 1 is a block diagram illustrating an exemplary computing system configured to provide a user interface and qualitative score for use in editing a media presentation.

FIG. 1 is a block diagram illustrating an exemplary computing system 100 configured to provide a user interface and qualitative score for use in editing a media presentation. In this example, computing system 100 comprises a platform 102 having a processor 104 with access via bus 106 to a tangible computer-readable medium 108 embodying program components. In this example, the program components reside in memory, which can comprise RAM, ROM, Flash memory, or any other suitable storage medium. Additional components include input-output (I/O) handling components 110, a display 120, user input (UI) devices 116 (e.g., a mouse, keyboard, touch screen interface, etc.), one or more networking or other interfaces 118 (e.g., Ethernet, USB, etc.), and storage 114 (e.g., hard disk, optical drive(s)).

The program components in memory 108 comprise a media authoring application including a user interface module 122, a presentation management module 124, and a qualitative evaluation module 126. Memory 108 also includes presentation data 128 which can comprise data for providing a media presentation such as a video. As will be noted below, presentation data 128 can also comprise metadata describing one or more aspects of the media presentation that can be used by the media authoring application to provide an enhanced editing workflow. Memory 108 may include further components such as an operating system, runtime environment, and/or one or more other applications.

In some embodiments, user interface module 122 configures computing system 102 to provide a user interface for editing footage of a media presentation. The footage may comprise one or more portions having video and/audiovisual content. For example, user interface module 122 may generate a timeline or other view for adjusting audio, visual, and other components of the presentation in response to user input including pointer gestures (e.g., mouse clicks, drags, hovers, etc.), keyboard input, and/or other input. In some embodiments, user interface module 122 also provides one or more visual effects to identify one or more portions of a media presentation as being of interest based on evaluation of presentation characteristics reflected in the metadata.

Presentation management module 124 represents functional components of the authoring application that are used to track and implement changes to media presentations. For example, presentation management module 124 can be configured to handle the details of locating specified video components, generating overlay and transition effects, and otherwise providing media editing functionality as is known in the art. In accordance with some aspects of the present subject matter, presentation management module 124 can be used to access metadata and, in some instances, update the metadata based on qualitative evaluations. Additionally, presentation management module 124 can be configured to perform automatic edits based on qualitative evaluations, including, but not limited to, removing one or more segments of a media presentation that are not sufficiently interesting as reflected in qualitative scores for the segments and/or other analysis.

Qualitative evaluation module 126 configures computing system 102 to access metadata associated with the media presentation and use the metadata to determine a qualitative score for at least one video segment of the media presentation as a measure of how interesting the segment is. In some embodiments, a qualitative score is determined for each frame of the media presentation by accumulating score values for various factors identified from an analysis of metadata associated with the frame. The measure of whether a segment is interesting can be based on any number of factors, including, but not limited to, factors representative of the quality of the segment, content of the segment, and/or the content of metadata, such as keywords associated with the segment.

Metadata used by qualitative evaluation module 126 may be included in the media presentation data 124 and/or may be generated by authoring application 116 in accordance with various techniques, such as object recognition/tracking algorithms, speech-to-text processing, facial recognition algorithms, image evaluation algorithms, and the like. Regardless of the source of the metadata, qualitative evaluation module 126 can identify the presence, absence, or values associated with each of one or more factors and then use data correlating factors to score values to generate a score representative of the degree to which the segment under consideration is to be considered of interest (i.e. interesting).

In the example above of FIG. 1, the media authoring application was depicted at a local device. Embodiments include a media application that is provided remotely, such as via a web service. For instance, a client may use a browser or client-side application (e.g., an Adobe® Flash® or Air® client) to interface with a web service that provides data for generating the user interface at the client and response to input relayed via the client, with the scoring and management functions handled by one or more computing devices of the web service. Additionally, the functionality attributed to different modules is for purposes of example only, and in various embodiments functionality may be distributed differently.

Figure 2:
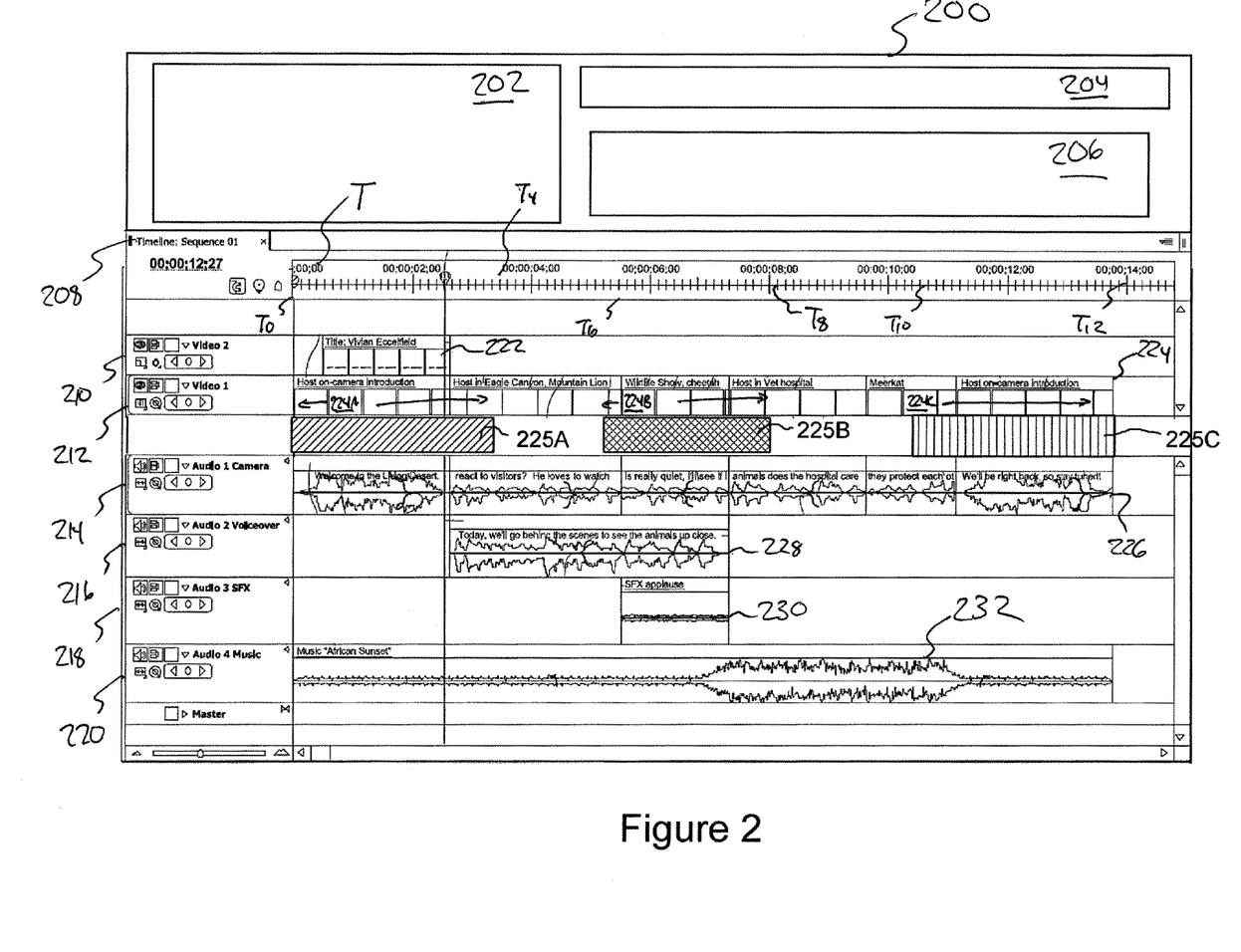
FIG. 2 is a diagram illustrating an example of a user interface for editing one or more segments of a media presentation.

FIG. 2 is a diagram illustrating an example of a user interface 200 for editing one or more segments of a media presentation. In this example, interface 200 includes a preview area 202 which may depict the media presentation during playback or may indicate a still image of a selected frame. Information area 204 may display the file name for the media presentation and other information such as file type, path, and other information. Playback controls 206 may include play, pause, rewind, fast-forward, volume, and other controls.

Edit area 208 can include a plurality of tracks 210, 212, 214, 216, 218, and 220 for assembling various audio, visual, and other components into a composite media presentation. In this example, the components are laid out along a timeline T. A play head 222 may advance along timeline T from left to right as the media presentation is played and may also be positionable to select a given portion of the presentation.

In this example, the media presentation includes a plurality of video components 224 placed in track 212 and a plurality of audio components 226, 228, 230, and 232 placed in audio tracks 214, 216, 218, and 220. Track 210 may be used, for example, to place components corresponding to visual effects (e.g., text overlays, special effects, etc.). Each component can correspond to a respective file or portion of a file accessible by the media authoring application, for instance. In this example, a plurality of video components are shown, although the subject matter is applicable to analysis of segments of a single video component. Additionally, in practice, more or fewer tracks may be supported by the media authoring application and/or another visual representation of the components of the media presentation can be used, such as a list view, icon view, etc.

As shown at 224A, 224B, and 224C, video components 224 may be depicted as a series of frames or key frames representing portions of the video footage. In accordance with the present subject matter, visual effects 225A, 225B, and 225C are added to reflect the relative interest of segments of the video components as determined from the metadata associated with the respective segments. As indicated by the different cross-hatching, visual effects 225A, 225B, and 225C represent different colors in a color bar that is parallel to the frames 224 representing the video segments. As another example, the visual effects may comprise highlighting over the frames themselves.

For instance, effect 225A may indicate that a segment from T0 to T4 is of low interest by using a first color, such as red. Visual effect 225B may indicate that a segment from T6 to T8 is of high interest using a different color, such as green. Visual effect 225C may indicate that a segment from T10 to T12 is of moderate interest using a third color, such as yellow. It will be understood that any suitable color scheme can be used and the scheme could be defined by a user of the application.

Any suitable visual effect(s) can be used. In addition to or instead of a color bar or highlighting frames, a textual or numerical overlay could be included indicating an interest level in terms of score or a descriptor mapped to a score (e.g., "interesting," "moderately interesting," "not interesting," etc.). As a further example, animation, ghosting-out of content with low score values, or other effects could be used.

Figure 3:
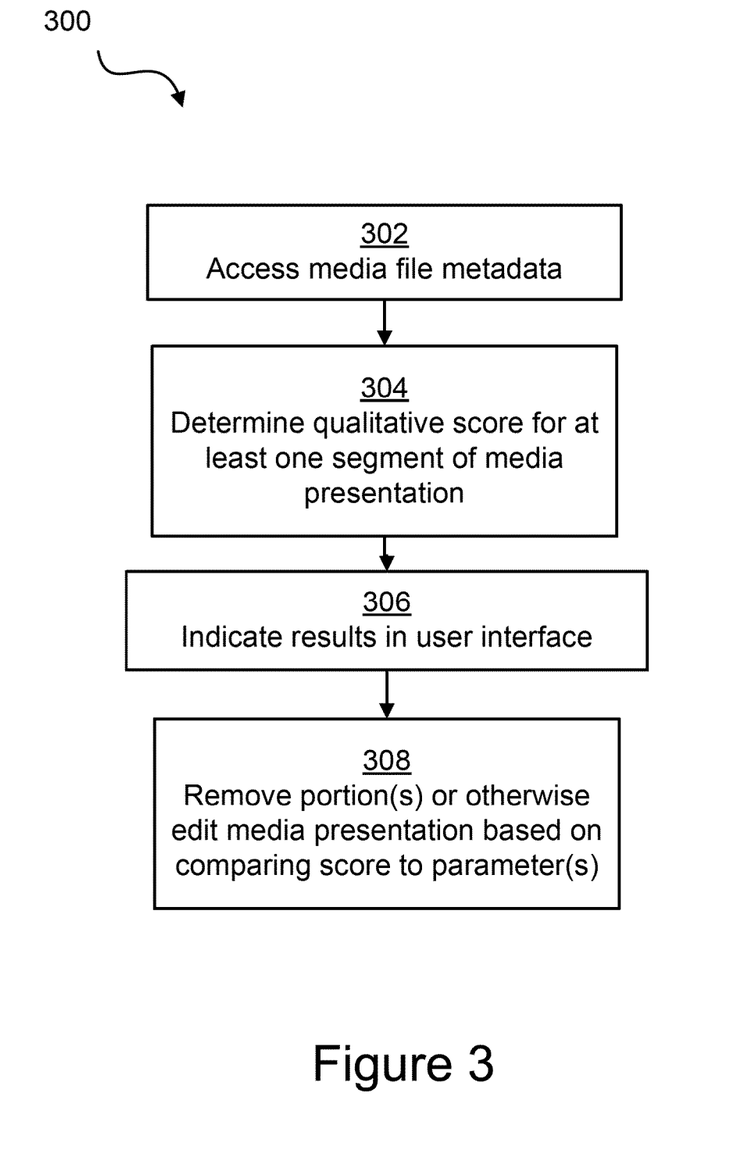
FIG. 3 is a flow chart illustrating exemplary steps in a method of editing a media presentation.

FIG. 3 is a flow chart illustrating exemplary steps in a method 300 for editing a media presentation. Block 302 represents accessing metadata included in or associated with one or more media files of a media presentation. For example, the metadata may be generated by a media authoring application and/or may be included with the media file(s) by the device(s) that capture the files. Block 304 represents determining a qualitative score for at least one segment of the media presentation by using the metadata.

As will be discussed later below, block 306 represents indicating the score results in the user interface using one or more visual or other effects, while block 308 represents a step taken in some embodiments to remove one or more portions of the media presentation or otherwise edit the content of the presentation based on comparing the score to one or more parameters.

Returning to block 304, the score can be determined in any number of ways. As an example, in some embodiments the metadata includes information relating to the number of subjects in a segment. For example, object or shape recognition algorithms may provide a count for the number of people or other subjects of interest and include that information in the metadata. A score value can be generated by applying a multiplier to the number of subjects recognized in the segment. As another example, the qualitative analysis module can be configured to identify a change in a number of subjects depicted in the video segment as compared to an earlier segment from the metadata and use the change in determining the qualitative score.

In some embodiments, the amount of motion in a segment influences the score. For example, motion of one or more subjects may correlate to a higher score, with the amount of motion reflected in the metadata based on the number of moving subjects, speed, and other considerations.

As another example, the qualitative evaluation module can be configured to identify facial recognition results in the metadata and use the facial recognition results in determining the qualitative score. For example, the score may be increased based on the recognition of any faces so as to identify portions of the presentation including human faces as being of interest. As another example, the score may be increased (or decreased) based on recognition of specific faces. For example, the qualitative evaluation module may access a list of identifiers of faces of interest and increase the score for one or more segments found to contain the faces of interest. In addition to or instead of facial recognition, metadata indicating recognition of other subjects (e.g., animals, objects, scenes) may be used.

In some embodiments, the qualitative evaluation module is configured to identify a keyword of interest and use the presence or absence of the keyword of interest in the metadata for the segment in determining the qualitative score. For example, the metadata may include keywords input by one or more users and/or as the result of automatic analysis of content of the segment, such as speech-to-text conversion, optical character recognition, or input of a script or other data regarding the segment. If a segment includes keywords identified by a user as correlating to interesting segments, segments with those keywords may be scored higher than segments without those keywords.

As a further example, the qualitative evaluation module can rely on audio metadata. For instance, the qualitative evaluation module may be configured to identify an audio characteristic indicated in the metadata such as the number of speakers, language(s) spoken, or the presence or absence of speech and use the audio characteristic in determining the qualitative score. For instance, a segment containing speech of any kind may receive a higher score than a segment with no speech or inaudible speech. As another example, particular words, phrases, or other audio content may be reflected in the metadata and used to increase or decrease the score of a segment accordingly.

As yet another example, the qualitative evaluation module may be configured to use metadata identifying one or more characteristics related to the quality of the content of the segment. For instance, the metadata may reflect the lighting level, focus or lack thereof, contrast level, or degree of camera shake in the segment. Factors indicating higher quality (e.g., high contrast, low or no shake, etc.) may result in a higher score for the segment.

In some embodiments, the qualitative evaluation module can use metadata reflecting camera or other capture device activity in determining a score for a segment. Information on camera motion and activity can be accessed in some embodiments from tags included in the metadata, the tags denoting information such as the type of motion, direction, and speed.

For example, metadata regarding camera motion before, during, and/or after the segment can be used to infer whether the camera zooms in on a subject or zooms out for a wider view. Segments comprising the zoomed-in view and the wide view may receive higher scores than the segment(s) comprising zoom-in-progress, with the zoomed-in view receiving the highest score. As another example, camera motion such as panning can be interpreted for scoring purposes. A fast pan may indicate that the segment at the end of the pan motion is interesting, and so the segment may receive a higher score. A slow pan can be interpreted as indicating that the segment(s) comprising the pan are of interest.

Returning to block 306 of FIG. 3, once the qualitative score for a segment is available, the score can be indicated in the user interface using one or more visual or other effects. For example, a color bar indicating interest level using different colors adjacent to corresponding segments can be used or the segments may be highlighted or annotated as noted above.

Block 308 represents removing one or more portions or otherwise editing the media presentation based on comparing the scores of respective segments to a parameter or parameters. For example, the score for a segment may be compared to a threshold score and, if the score is below the threshold, the segment may be identified for removal. In some embodiments, the segment may be removed automatically or removal may be confirmed by user input (e.g., via a dialog box). The parameter(s) may be associated with logic specifying desired editing actions including, but not limited to, removal of uninteresting footage. For example, a user may provide a rule that the play rate for uninteresting segments is to be increased.

As another example, the media authoring application may include an interface such as a dialog in which a user can specify desired attributes of a final cut of a media presentation, such as a specific duration. The media authoring application can then determine a score for portions of footage input to the application and remove enough footage to arrive at the specified duration, starting from the least-interesting segments as indicated by scoring results.

In addition to or instead of a threshold score, the removal/editing parameter(s) may include more complex logic, such as rules or parameters for specifying whether to keep or discard footage based on the presence or absence of specific attributes or content. As an example, Boolean logic can be used to specify the threshold for removal or other editing in closer detail. For instance, a user may specify that uninteresting footage is to be marked for removal subject to (i) the score being below the threshold and (ii) no dialog in the footage. As another example, the conditions may specify that footage is to be removed if (i) it has a score below the threshold and (ii) no facial recognition results showing a face of interest may be marked for removal. Thus, footage that would otherwise be removed may be saved from removal.

Editing decisions may be based on a segment but may affect portions of the media presentation outside the segment. For example, video footage of a media presentation may be included in one or more video components. A segment of interesting (or uninteresting) content may occupy some or all of a component or may span multiple components. If, for example, uninteresting content is to be trimmed, the respective portions of the video components may be trimmed so that only the portions with interesting content remain. However, in some embodiments, an entire component can be retained or removed based on the presence or absence of interesting (or uninteresting) content in a segment included in the component.

Figure 4:
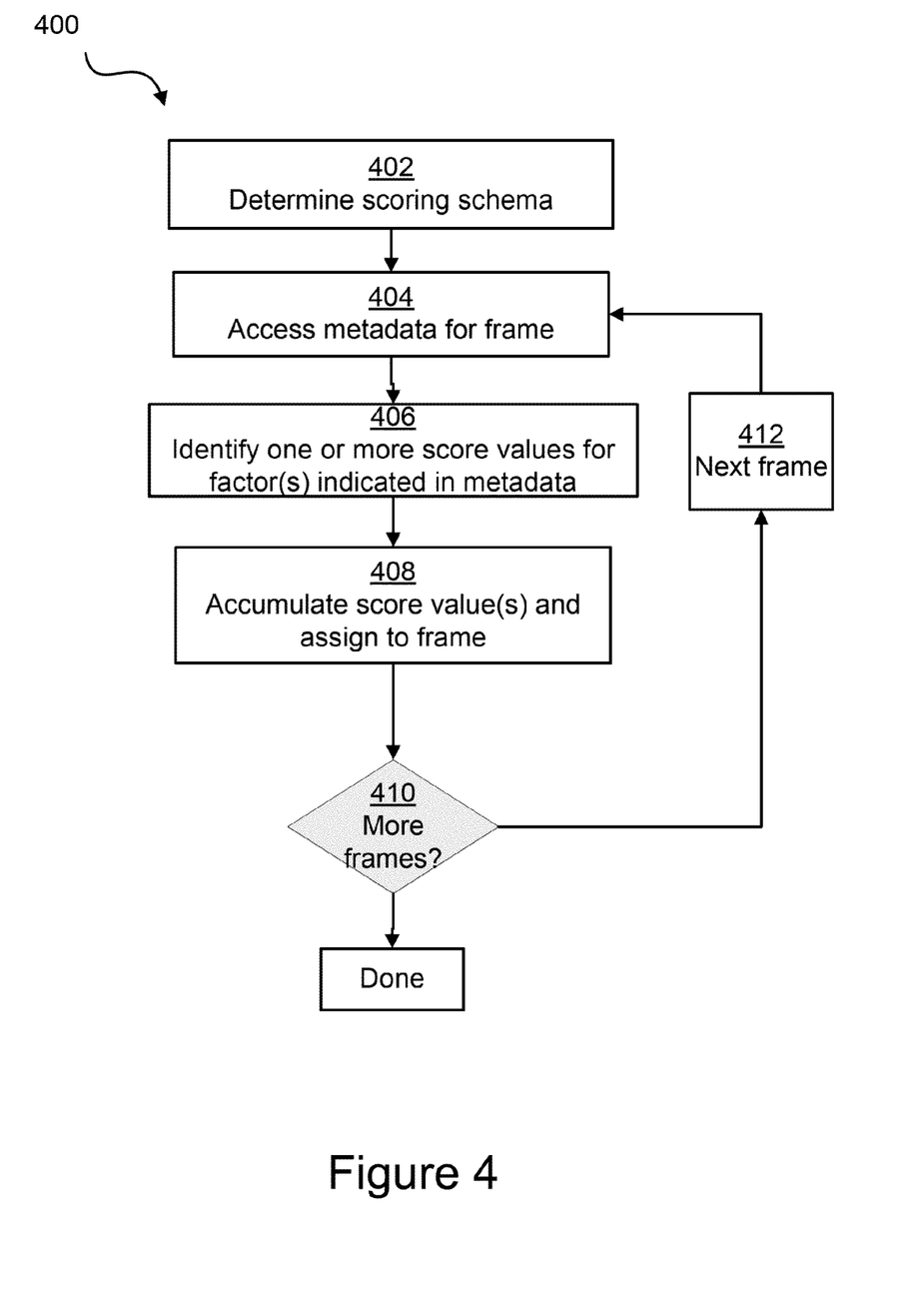
FIG. 4 is a flow chart illustrating exemplary steps in a method of generating a qualitative score.

FIG. 4 is a flow chart illustrating exemplary steps in a method 400 of generating a qualitative score for a segment. In this example, a score value is accumulated for each frame based on analyzing multiple factors.

At block 402, a scoring schema is accessed. The scoring schema can comprise data mapping characteristics to scoring behaviors and may be selectable or modifiable by a user. For example, the scoring schema may specify the lighting, contrast, and other quality conditions for providing a positive score. Additionally, the scoring schema may identify faces and keywords of interest and other characteristics and characteristic values as well as the influence of various characteristics on the scoring process. For example, facial recognition results may be weighted more heavily than camera shake.

At block 404, metadata for a frame is accessed, and at block 406 one or more score values for the characteristics reflected in the metadata can be identified. For instance, positive score values may be associated with high quality/interesting footage, while negative score values may be associated with low quality/uninteresting footage as set forth in the schema. Block 408 represents accumulating the score values and assigning an aggregate score to the frame. In some embodiments, Boolean logic may factor into the schema and/or aggregation process.

Block 410 represents a check for additional frames. If more frames remain to be analyzed, then block 412 represents looping through the next frame until all frames of the presentation or portion thereof have been evaluated.

In some embodiments, additional processing can occur once scores have been assigned to a plurality of frames. For example, smoothing may be performed to remove noise in the score values such as sharp spikes or drops in the score between frames in a group having otherwise similar scores. The smoothed set of scores may allow for more effective indications of interesting segments and/or cleaner edits.

As was noted above, in some embodiments, visual effects are generated to indicate trimmable segments based on a qualitative score that does not meet a threshold value. However, the trimmable segments may be derived from a plurality of shorter segments that are then merged to create resultant segments, with smoothing occurring during the merge process. For instance, the media presentation may be treated as one continuous set of footage and then segments analyzed on a frame-by-frame basis as noted above. Then, short groups of frames with similar scores can be defined, while ignoring very short (e.g., 2-3 frames) runs of frames having scores diverging from the surrounding groups of frames. The short groups (along with very short groups included therein) can be merged into resultant segments that are used as the basis for indicating trimmable segments.

Figure 5:
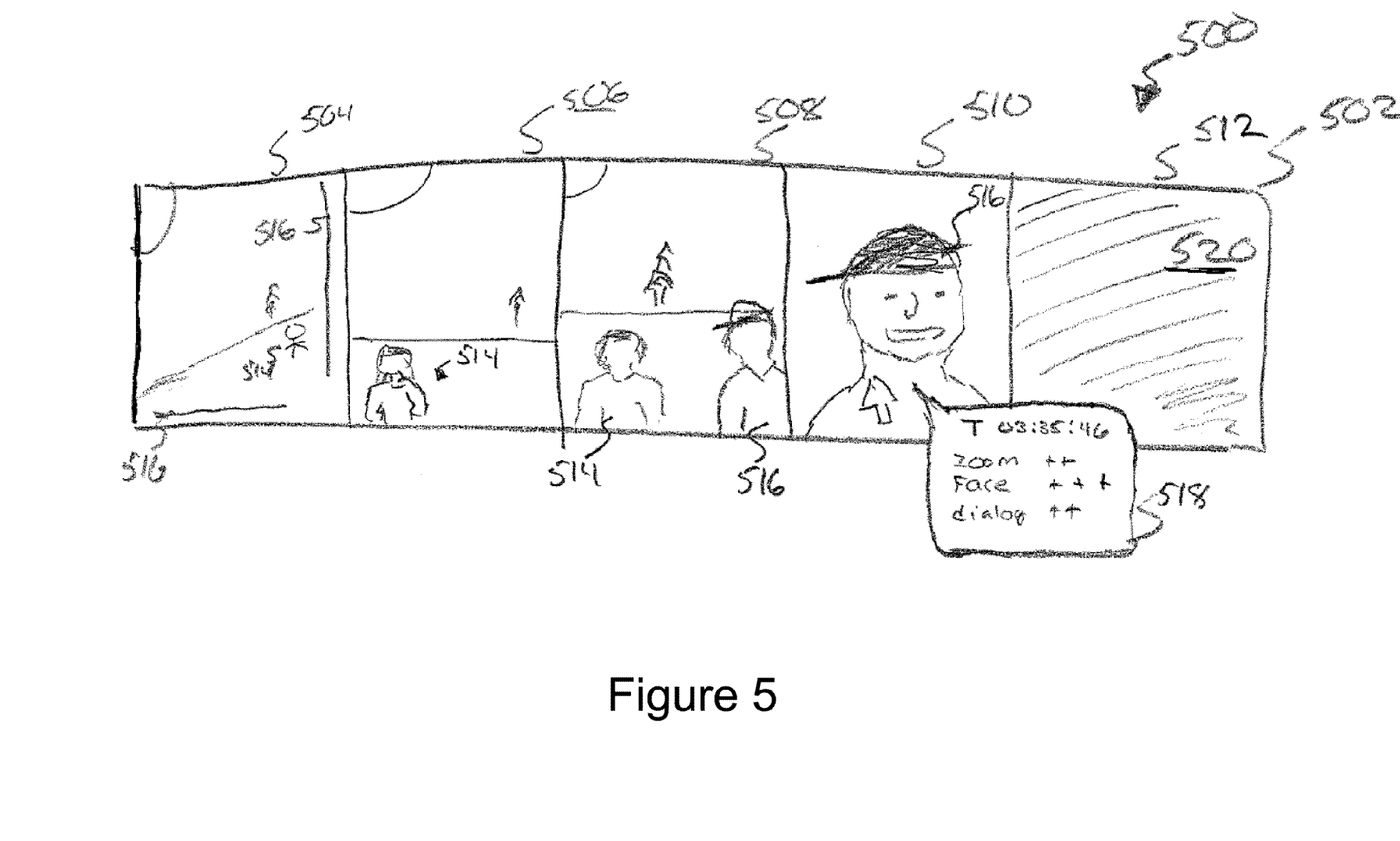
FIG. 5 is a diagram illustrating an example of a user interface including a visual effect based on a qualitative score for one or more segments of a media presentation.

FIG. 5 is a diagram 500 illustrating an example of a user interface including a visual effect based on a qualitative score for one or more segments of a media presentation. In this example, an interface 502 is presented including frames 504, 506, 508, 510, and 512, with each frame corresponding to a segment of a video presentation. In practice, each segment may be represented by a plurality of frames rather than the single frames shown here.

Frame 504 represents an initial segment such as when a video recording device is initially turned on and positioned. As indicated at 514, a first subject is visible, but the horizon is skewed and as shown at 516 the camera is shaking. In the next segment as exemplified by frame 506, the first subject 514 is visible and shaking has stopped. Moving into the third segment, indicated by frame 508, the camera has panned to depict a second subject 516. In the fourth segment, the camera zooms in to second subject 516 as shown in frame 510. In frame 512, the presentation fades to black as shown at 520.

Metadata for frames 504, 506, 508, 510, and 512 may include information regarding the presentation that can be used in generating scores as noted above. For example, metadata for frame 504 and related frames may indicate the degree of camera shake and the rotational motion of the camera during the initial segment as the camera is set up. This may result in a low score for the initial segment. Facial recognition analysis may identify that frame 506 and surrounding frames of the second segment include a human face which, in conjunction with audio may result in a higher score for the second segment.

The third segment as indicated by frame 508 features two human faces. Assuming that the third segment also includes dialog or other activity, the score for the third segment may be higher than both the first and second segments. The fourth segment may receive a still higher score based on the zoom to subject 516, which may be used to infer a high interest level. Additionally, facial recognition results in the metadata may identify that second subject 516 matches faces in other videos and/or matches a face identified as being of interest. The final segment as indicated by frame 512 may receive a low score due to the low lighting/lack of lighting or other visible subjects.

Interface 502 may be presented in a media authoring or other application with highlighting or another visual effect indicating that frames 506, 508, and 510 are interesting and/or an effect indicating that frames 504 and 512 are not interesting. Additionally or alternatively, the degree of interest (disinterest) may be reflected using different colors, numerical scores, or other identifiers. In some embodiments, frames 504 and 512 may be automatically trimmed from the media presentation with or without confirmation by a user.

Interface 502 also includes another example of a visual effect. As shown at 518, a tooltip has been provided in response to a user gesture with respect to frame 510. In this example, tooltip 518 indicates the time index (03:35:46) for the frame and factors used in deriving the score for the frame (in this example, "zoom++", "face+++", and "dialog++"). No negative factors are shown in this example, but negative factors may be displayed; raw score information may be provided as well or instead of the "+" indicators of this example.

GENERAL CONSIDERATIONS

Some portions of the detailed description were presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here and generally is considered to be a self-consistent sequence of operations or similar processing leading to a desired result. In this context, operations or processing involve physical manipulation of physical quantities.

Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels.

Unless specifically stated otherwise, as apparent from the foregoing discussion, it is appreciated that throughout this specification discussions utilizing terms such as "processing," "computing," "calculating," "determining" or the like refer to actions or processes of a computing platform, such as one or more computers and/or a similar electronic computing device or devices, that manipulate or transform data represented as physical electronic or magnetic quantities within memories, registers, or other information storage devices, transmission devices, or display devices of the computing platform.

The various systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software, that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

As noted above, a computing device may access one or more computer-readable media that tangibly embody computer-readable instructions which, when executed by at least one computer, cause the at least one computer to implement one or more embodiments of the present subject matter. When software is utilized, the software may comprise one or more components, processes, and/or applications. Additionally or alternatively to software, the computing device(s) may comprise circuitry that renders the device(s) operative to implement one or more of the methods of the present subject matter.

Examples of computing devices include, but are not limited to, servers, personal computers, personal digital assistants (PDAs), cellular telephones, televisions, television set-top boxes, portable music players, and consumer electronic devices such as cameras, camcorders, and mobile devices. Computing devices may be integrated into other devices, e.g. "smart" appliances, automobiles, kiosks, and the like.

The inherent flexibility of computer-based systems allows for a great variety of possible configurations, combinations, and divisions of tasks and functionality between and among components. For instance, processes discussed herein may be implemented using a single computing device or multiple computing devices working in combination. Databases and applications may be implemented on a single system or distributed across multiple systems. Distributed components may operate sequentially or in parallel.

When data is obtained or accessed as between a first and second computer system or components thereof, the actual data may travel between the systems directly or indirectly. For example, if a first computer accesses data from a second computer, the access may involve one or more intermediary computers, proxies, and the like. The actual data may move between the first and second computers, or the first computer may provide a pointer or metafile that the second computer uses to access the actual data from a computer other than the first computer, for instance. Data may be "pulled" via a request, or "pushed" without a request in various embodiments.

The technology referenced herein also makes reference to communicating data between components or systems. It should be appreciated that such communications may occur over any suitable number or type of networks or links, including, but not limited to, a dial-in network, a local area network (LAN), wide area network (WAN), public switched telephone network (PSTN), the Internet, an intranet or any combination of hard-wired and/or wireless communication links.

Any suitable tangible computer-readable medium or media may be used to implement or practice the presently-disclosed subject matter, including, but not limited to, diskettes, drives, magnetic-based storage media, optical storage media, including disks (including CD-ROMS, DVD-ROMS, and variants thereof), flash, RAM, ROM, and other memory devices.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. A computer-implemented method comprising:
    accessing metadata indicating at least one characteristic of footage of a media presentation, the footage comprising a plurality of segments;
    determining a qualitative score for at least one segment of the footage based on the metadata; and
    providing a user interface displaying the plurality of segments, wherein the user interface includes a visual effect for each segment selected from a plurality of visual effects based at least in part on the segment's qualitative score relative to a threshold value, wherein selections of visual effects for corresponding video segments vary based on qualitative scores of the corresponding video segments relative to a plurality of thresholds.

2. The computer-implemented method set forth in claim 1, wherein the qualitative score is determined for a plurality of frames of the media presentation.

3. The computer-implemented method set forth in claim 1, wherein the qualitative score for the segment is determined based on metadata indicating at least one of a lighting, focus, contrast, or camera shake characteristic in the segment.

4. The computer-implemented method set forth in claim 1, wherein the qualitative score for the segment is determined based on metadata indicating at least one of:
   a degree of movement of one or more subjects in the segment, recognition of one or more faces in the segment, audio content of the segment, or zoom/focus on a subject in the segment.

5. The computer-implemented method set forth in claim 1, wherein the qualitative score for the segment is based on evaluating at least one of camera movement before the segment, camera movement during the segment, or camera movement after the segment.

6. The computer-implemented method set forth in claim 1, wherein the metadata comprises one or more keyword tags and the qualitative score for the segment is determined based on identifying one or more keyword tags of interest in the metadata for the segment.

7. The computer-implemented method set forth in claim 1, further comprising:
   comparing the qualitative score for the segment to a parameter; and
   removing the segment from the media presentation if the segment does not meet the parameter.

8. A computing system comprising a processor with access to a tangible computer-readable medium embodying program components, the program components comprising:
   a user interface module that configures the computing system to provide a user interface for editing a media presentation comprising a plurality of video segments; and
   a qualitative evaluation module that configures the computing system to access metadata associated with the media presentation and use the metadata to determine a plurality of qualitative scores for the plurality of video segments of the media presentation, and
   wherein the user interface module generates a plurality of visual effects for the plurality of video segments based at least in part on the plurality of qualitative scores and a plurality of threshold values, wherein the plurality of visual effects for the plurality of video segments vary based on the plurality of qualitative scores relative to the plurality of threshold values.

9. The computer-implemented method of claim 1, wherein the visual effect is included in the user interface at a location that corresponds to a location of the respective segment.

10. The computer-implemented method of claim 1, wherein the visual effect is a coloring effect comprising one of a plurality of colors.

11. The computer-implemented method of claim 10, further comprising selecting one of the plurality of colors for the coloring effect based at least in part on the qualitative score for the respective segment relative to the threshold value.

12. The computer-implemented method of claim 1, wherein the at least one segment is associated with a plurality of parameters, wherein a parameter score is determined for each parameter of the plurality of parameters, and wherein a visual effect for the at least one segment comprises indications of the parameter scores and an indication of the qualitative score for the at least one segment.

13. The computer-implemented method of claim 1, further comprising:
   determining a rule for editing the media presentation, the rule specifying editing actions based on qualitative scores relative to thresholds and based on attributes of the media presentation;
   determining an editing action from the editing actions for the at least one segment based on a qualitative score of the at least one segment relative to a threshold and based on an attribute of the last one segment; and
   editing the at least one segment according to the editing action.

14. The computing system set forth in claim 8, further comprising a content management module that configures the computing system to automatically remove the video segment based on comparing the qualitative score to a removal parameter.

15. The computing system set forth in claim 8, wherein the user interface module further configures the computing system to provide a visual effect in the user interface, the visual effect associated with a video segment of the media presentation provided based on the qualitative score for the video segment renders information included in the metadata at each video segment used to determine the qualitative score for the respective video segment.

16. The computing system set forth in claim 8, wherein the qualitative evaluation module is configured to identify a change in a number of subjects depicted in the video segment from the metadata and use the change in determining a qualitative score for at least one video segment of the media presentation.

17. The computing system set forth in claim 8, wherein the qualitative evaluation module is configured to identify facial recognition results in the metadata and use the facial recognition results in determining a qualitative score for at least one video segment of the media presentation.

18. The computing system set forth in claim 8, wherein the qualitative evaluation module is configured to identify a keyword of interest and use the presence or absence of the keyword of interest in determining a qualitative score for at least one video segment of the media presentation.

19. The computing system set forth in claim 8, wherein the qualitative evaluation module is configured to identify an audio characteristic in the metadata and use the audio characteristic in determining a qualitative score for at least one video segment of the media presentation.

20. The computing system set forth in claim 8, wherein the qualitative evaluation module is configured to use metadata identifying at least one of the lighting, focus, contrast, or camera shake in determining a qualitative score for at least one video segment of the media presentation.

21. The computer system set forth in claim 15, wherein the information included in the metadata is rendered upon receiving a user gesture that identifies the video segment.

22. A computer program product comprising a non-transitory computer readable medium tangibly embodying program code comprising:
   program code for accessing metadata indicating at least one characteristic of a media presentation comprising a plurality of segments;
   program code for determining a qualitative score for at least one segment of the media file based on the metadata;
   program code for storing data identifying the qualitative score and the segment in a computer-readable medium; and
   program code for providing a user interface displaying the plurality of segments, wherein the user interface includes a visual effect for at least one segment based on the segment's qualitative score, wherein visual effects for the plurality of segments change based on qualitative scores of the plurality of segments relative to a plurality of thresholds; and program code for providing a timeline view of the plurality of segments and the visual effect for the at least one segment included in the user interface.

23. The computer program product set forth in claim 22, further comprising:

program code for providing the user interface comprising a timeline view of a media presentation wherein the visual effect comprises a coloring effect that includes one of a plurality of colors selected based at least in part on the qualitative score for the respective segment relative to a threshold value.

24. The computer program product set forth in claim 22, further comprising:

program code for removing the segment from the media presentation based on comparing the qualitative score to a parameter.

25. The computer program product set forth in claim 22, wherein determining the qualitative score for the segment comprises determining a qualitative score for each frame of the media presentation.

26. The computer program product set forth in claim 22, wherein the qualitative score for the segment represents a quality factor or an interest factor for the segment.

\* \* \* \* \*